No. 874,838. PATENTED DEC. 24, 1907.
B. FERGUSON.
WIND AND DUST SHIELD FOR RAILROAD COACHES.
APPLICATION FILED APR. 3, 1907.

2 SHEETS—SHEET 1.

Witnesses
Louis R. Heinrichs
C. Bradway

Inventor
Bassett Ferguson
By Victor J. Evans
Attorney

No. 874,838. PATENTED DEC. 24, 1907.
B. FERGUSON.
WIND AND DUST SHIELD FOR RAILROAD COACHES.
APPLICATION FILED APR. 3, 1907.
2 SHEETS—SHEET 2.
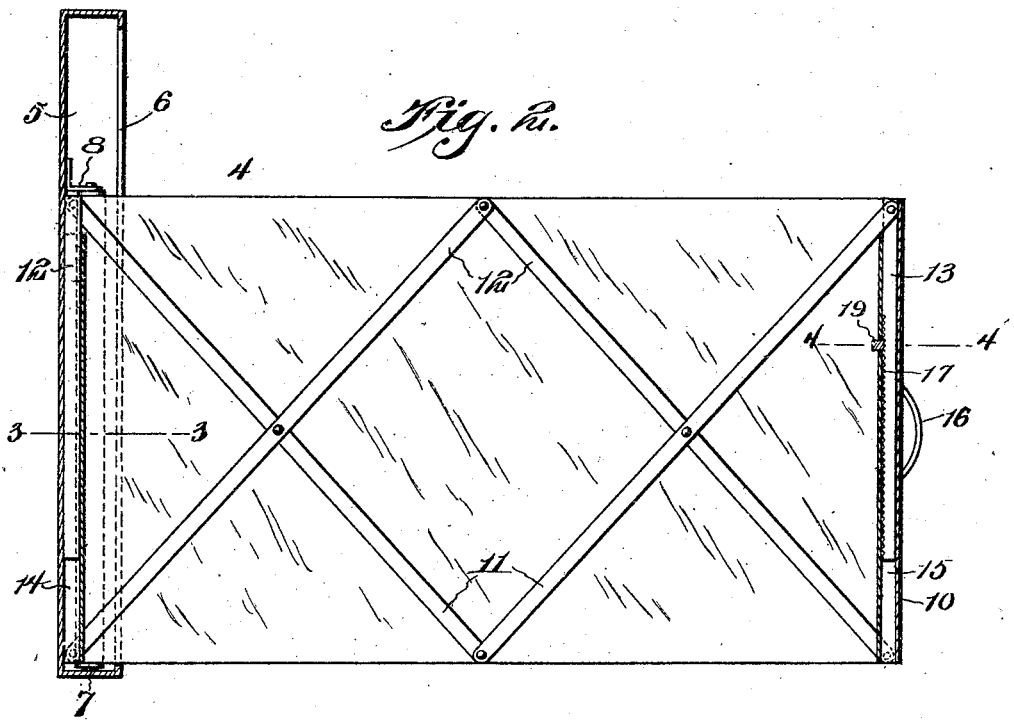
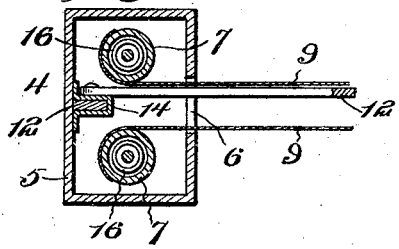
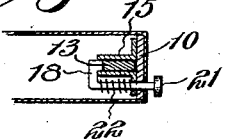
Witnesses
Louis R. Heinrichs
C. Bradway
Inventor
Bassett Ferguson
By Victor J. Evans
Attorney

UNITED STATES PATENT OFFICE.

BASSETT FERGUSON, OF MOORES, PENNSYLVANIA.

WIND AND DUST SHIELD FOR RAILROAD-COACHES.

No. 874,838.  Specification of Letters Patent.  Patented Dec. 24, 1907.

Application filed April 3, 1907. Serial No. 366,192.

*To all whom it may concern:*

Be it known that I, BASSETT FERGUSON, a citizen of the United States, residing at Moores, in the county of Delaware and State of Pennsylvania, have invented new and useful Improvements in Wind and Dust Shields for Railroad-Coaches, of which the following is a specification.

This invention relates to wind and dust protectors or shields designed for use in passenger cars, whereby any occupant can be protected from the wind, smoke, dust and cinders entering through the car window at the passenger's seat immediately in front.

The invention has for one of its objects to provide a device of this character which is of simple and inexpensive construction, easy to operate and so arranged as to effectively shield the occupants in a seat just behind an open window. In this connection, it may be remarked that when any passenger opens the window adjacent his seat, the wind, smoke, dust and cinders are not annoying to him for the reason that the motion of the car drives them into the faces of the occupants of the seats immediately in the rear, and the principal object of the present invention is to shield the passengers by producing a guard or protector between the rear passengers and the open window.

A further object of the invention is the employment of a shield or protector which is adapted to fold into a casing or housing attached to or built in the wall of the car so as to occupy little space when not in use.

Another object is the provision of a foldable shield composed of curtains adapted to wind on and unwind from suitably arranged rollers, and a collapsible frame connected with the curtains for supporting them in extended position.

With these objects in view and others, as will appear as the description proceeds, the invention comprises the various novel features of construction and arrangement of parts, which will be more fully described hereinafter and set forth with particularity in the claims appended hereto.

Figure 1:
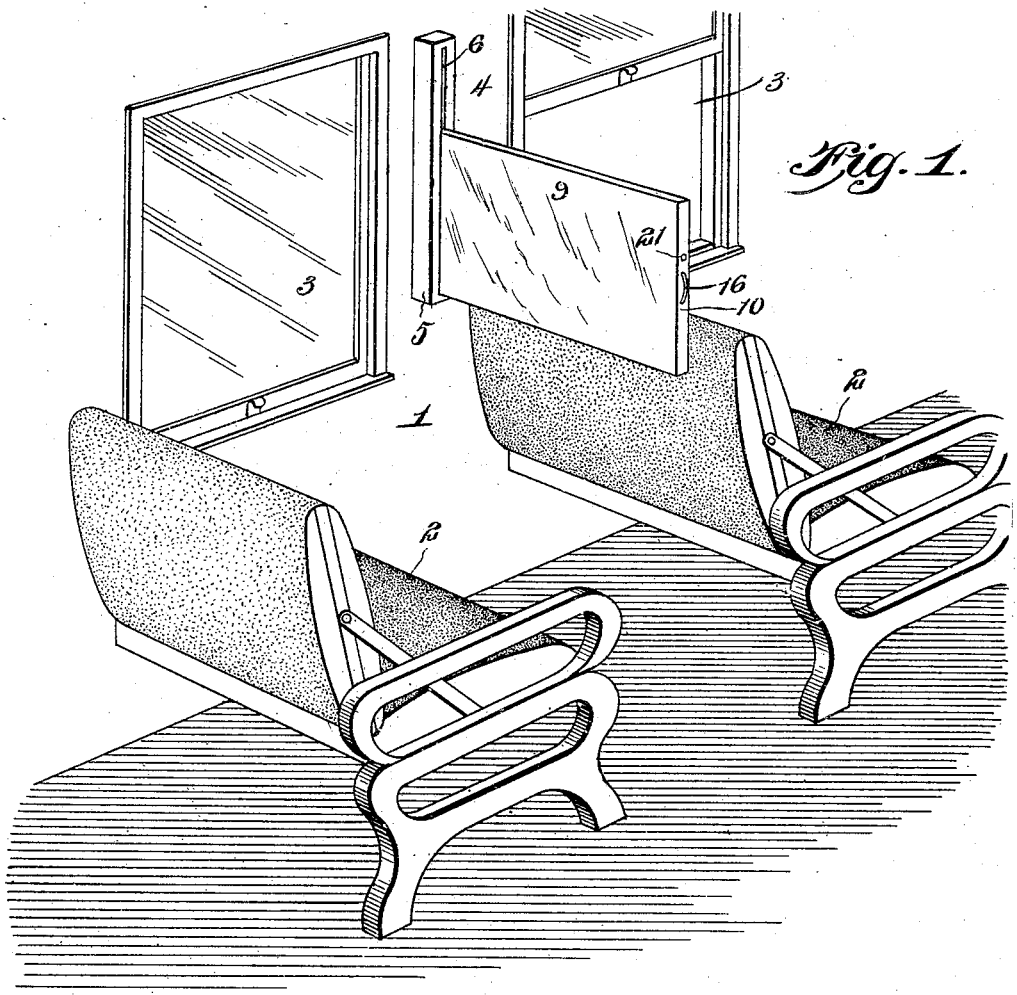
Figure 5:
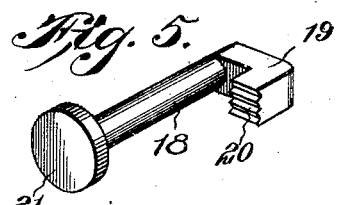

In the accompanying drawings, which illustrate one of the embodiments of the invention, Figure 1 is a perspective view of a passenger car showing the interior thereof and one of the shields in position. Fig. 2 is a vertical sectional view of the shield showing the same drawn out or in extended position. Fig. 3 is a horizontal section on line 3—3, Fig. 2, drawn on an enlarged scale. Fig. 4 is a similar view on line 4—4, Fig. 2, drawn on an enlarged scale. Fig. 5 is a perspective view of a lock for holding the shield in extended position.

Similar reference characters are employed to designate similar parts throughout the figures.

Referring to the drawings, 1 designates a car body having a plurality of passenger seats 2 and windows 3 adjacent each seat according to standard construction. Arranged between adjacent windows and at the rear of each seat, is a wind and dust shield designated generally by 4, that serves to protect the passengers immediately at the rear of the shield from wind, dust, smoke and cinders that enter the car when the window in front of the shield is opened.

The shield or protector comprises a housing or casing 5 that is supported on the side wall of the car between adjacent windows and which is provided in its front wall with a vertical longitudinal slot 6 into which the curtain of the shield is adapted to fold and unfold. This housing, which may be of any suitable construction, contains a pair of spaced vertically extending rollers 7 that are preferably of the spring-actuated type and mounted at their upper ends in bracket bearings 8 and at their lower ends in the bottom of the casing 5. On each roller is secured a flexible member 9 of leather or other suitable material to form the curtain proper, and the free ends of the members are secured to a vertically extending stiffening strip or plate 10 that is wide enough to just fit in the slot 6 of the casing 5. Between the two parts 9 of the curtain is arranged a foldable frame in the nature of lazy tongs and composed of hingedly connected links 11 and 12. The lower ends of the links 12 are pivoted respectively in the casing 5 and to the lower end of the stiffening strip 10, while the upper ends of the links 11 are pivoted to slides 12 and 13, respectively, that move vertically in guides 14 and 15 in the casing 5 and on the stiffening strip 10, respectively. As the lazy tongs are opened or closed, the members 12 and 13 slide up and down in their respective guides. When the shield is fully extended, the lazy tongs will be entirely concealed from view between the flexible members 9 thereof, and in order to permit the lazy tongs to fold into the casing or housing 5, the slot 6 of the latter is extended upwardly some distance above the top edges of the shield or curtain, as clearly shown in Figs. 1 and 2. The outer end of the curtain has a grip or pull 16, whereby the passenger can take hold of the shield to unfold or fold the same.

In order to hold the shield in extended position against the tension of the springs 16 of the curtain rollers, a suitable locking device is employed. For this purpose, the slide member 13 is provided with a plurality of teeth 17, as shown in Fig. 2, that are engaged by a lock bolt 18 having a hook-shaped extremity 19 provided with teeth 20 for engaging those of the member 13. The bolt 18 extends outwardly through the stiffening strip 10 and terminates in a push button or head 21, and on the bolt is a compression spring 22 that yieldingly holds the bolt in engagement with the member 13, so that the latter is locked against an upward movement. The teeth 17 and 20 are so shaped that as the shield is pulled outwardly, they slide over each other and automatically lock when the pull on the shield is released. The push button 21 is so arranged that the bolt can be pressed inwardly by the thumb, while the hand is gripping the pull 16. By thus pressing on the lock bolt, the latter is moved to inoperative position and the shield can be folded into the casing 4 without interference and when so folded, the bolt is released so as to hold the shield in position.

In practice, the device is so positioned that when the shield is drawn out, it will not interfere with the hats of the occupants of the seat in front thereof. When an occupant so desires to protect himself from the wind, dust, smoke and cinders, that enter when the window in front of him is opened, he takes hold of the grip 16 and pulls the shield outwardly to the position shown and it is automatically held in this position. When the window in front of the shield is closed, the latter is in folded position so that the view of the passengers will not be obstructed.

From the foregoing description taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown, is merely illustrative and that such changes may be made when desired as are within the scope of the claims.

Having thus described the invention, what I claim is:—

1. In a device of the class described, the combination of a flexible shield, a foldable frame concealed by and supporting the same, and a locking device for holding the frame in unfolded position.

2. In a device of the class described, the combination of an automatically winding curtain, a frame associated therewith for holding the curtain in extended position, and a locking device for adjustably holding the same in fixed position.

3. In a device of the class described, the combination of a casing, a self-winding curtain mounted therein, a frame foldable into and unfoldable from the casing and connected with the curtain for holding the latter distended, and a locking device for holding the frame in extended position.

4. In a device of the class described, the combination of a pair of self-winding curtains, a foldable frame disposed between them and connected with the free ends thereof, and a locking device for holding the frame in extended position.

5. In a device of the class described, the combination of a housing having a longitudinal slot, a pair of self-winding curtains movable in and out of the slot of the housing and lazy tongs mounted in the housing and connected with and disposed between the curtains to hold the latter in outdrawn position.

6. In a device of the class described, the combination of a housing, a self-winding curtain mounted therein, lazy tongs foldable into the housing, guide members connected with the tongs, guides in the housing and on the curtain for receiving the guide members, and a spring-actuated locking device for gripping one of the guide members to hold the tongs and curtain in extended position.

In testimony whereof, I affix my signature in presence of two witnesses.

BASSETT FERGUSON

Witnesses:
 WARREN LODGE,
 CHESTON M. BRYANT.